May 20, 1924.

G. H. SCHKOMMODAU

ELECTRIC SEAM WELDING MACHINE

Filed Nov. 29, 1918

Inventor
Gustave H. Schkommodau
By Townsend & Decker
Attorneys

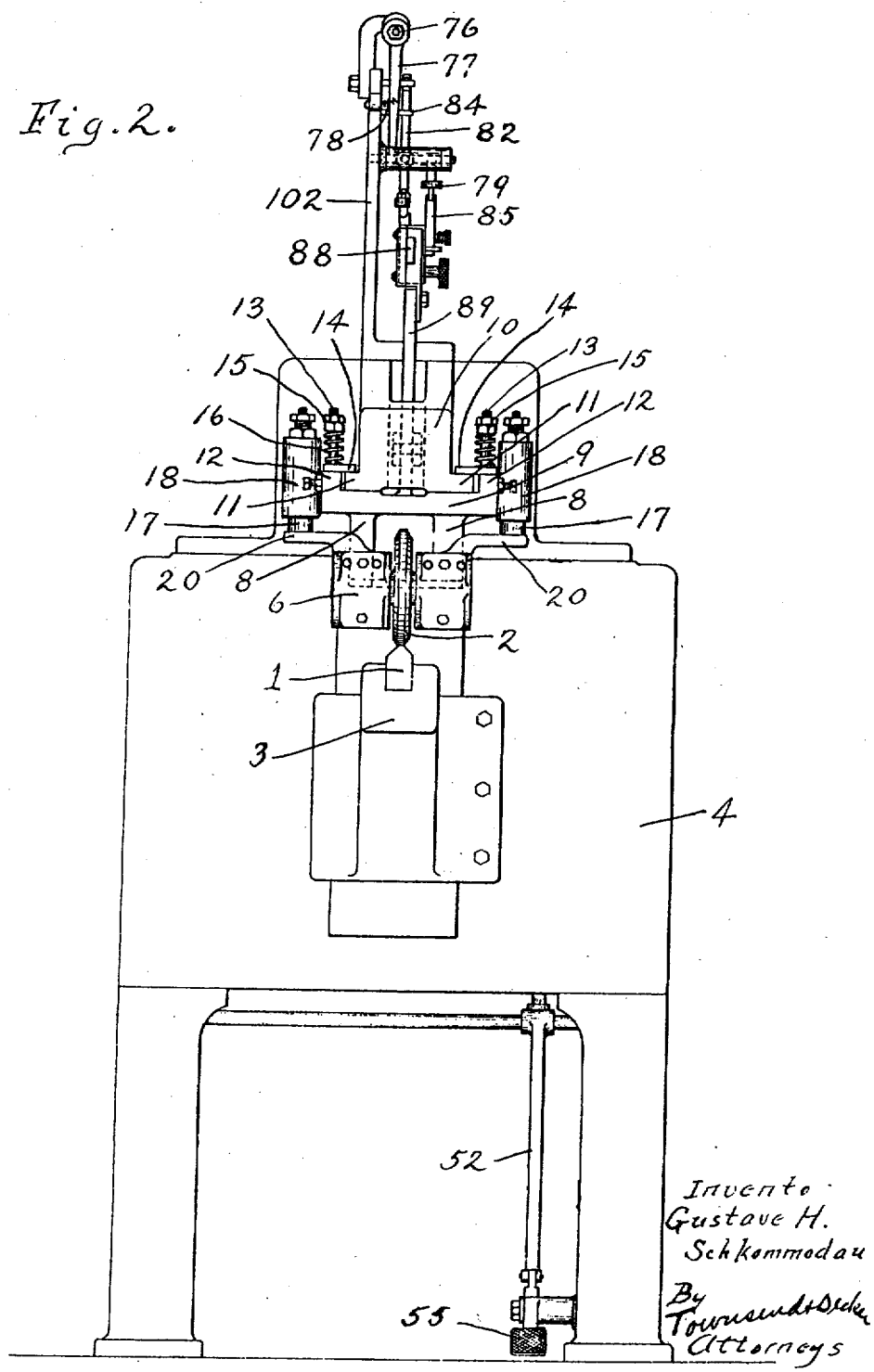

May 20, 1924.
G. H. SCHKOMMODAU
ELECTRIC SEAM WELDING MACHINE
Filed Nov. 25, 1918
1,494,713
3 Sheets-Sheet 3
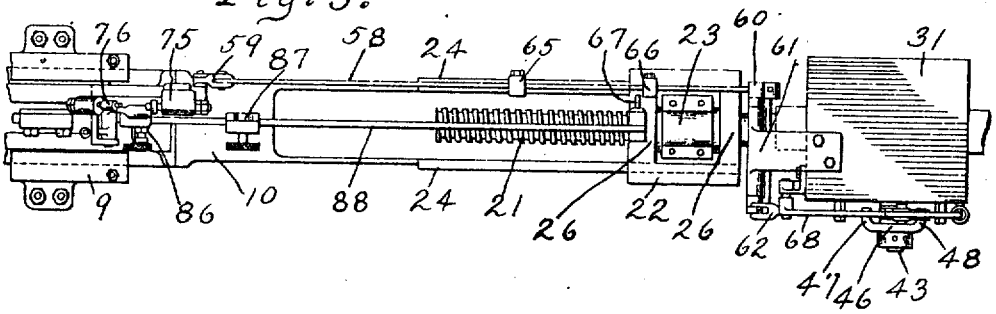
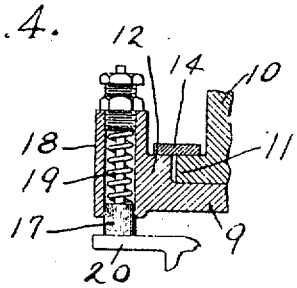
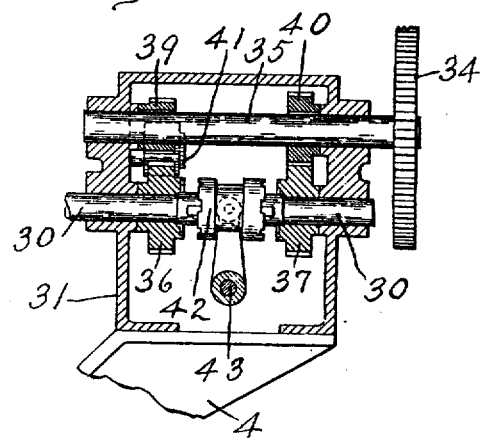
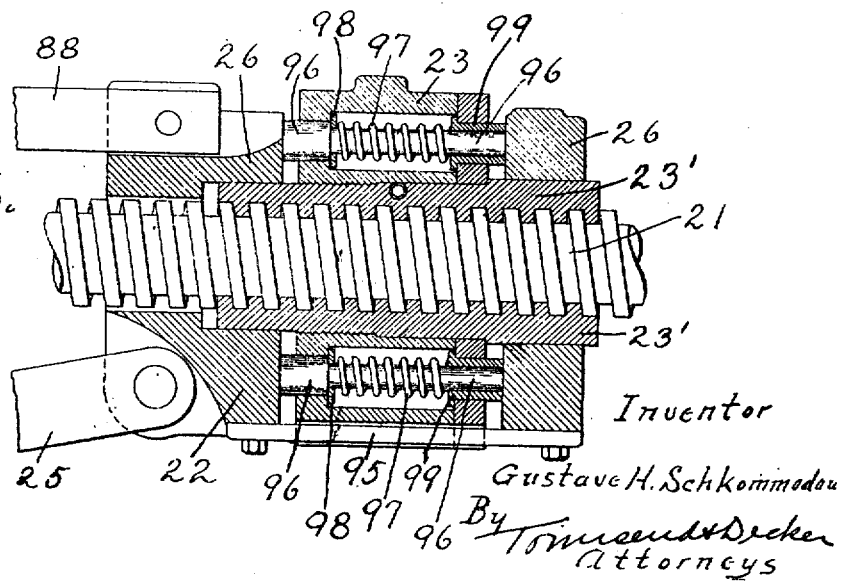
Inventor
Gustave H. Schkommodau
By Townsend & Decker
Attorneys Patented May 20, 1924.

1,494,713

UNITED STATES PATENT OFFICE.

GUSTAVE H. SCHKOMMODAU, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC SEAM-WELDING MACHINE.

Application filed November 29, 1918. Serial No. 264,519.

*To all whom it may concern:*

Be it known that I, GUSTAVE H. SCHKOMMODAU, a citizen of the United States, and a resident of Lynn, in the county of Essex and State of Massachusetts, have invented certain new and useful Improvements in Electric Seam-Welding Machines, of which the following is a specification.

My invention relates to electric seam welding machines in which the seam to be welded is brought to the requisite welding temperature by means of its resistance to the passage of an electric current of high amperage and low voltage through or across it. The current is applied by means of a suitable metallic roller or rollers which by preference also supplies the necessary pressure to complete the welding of the joint, the roller or rollers progressively engaging the seam to be welded throughout its length.

The object of the invention is to provide a simple, positively acting apparatus for quickly and effectively joining pieces or parts of metal together by a seam weld.

To this end the invention consists in the improved construction of electric welding machine hereinafter more particularly described and then specified in the claims.

In the accompanying drawings, Fig. 1 is a side elevation of an electric seam welding machine constructed in accordance with this invention.

Fig. 2 is a front elevation of the same.

Fig. 3 is a plan view of that portion of the machine showing the feed screw device for the roller electrode and the automatic current control.

Fig. 4 is an enlarged detached sectional view of the spring pressure device used to apply the necessary welding pressure to the electrode.

Fig. 5 is an enlarged vertical cross-section through the gear train and attendant mechanism by which the feed screw for causing the work-engaging electrode to travel both forward and reverse is actuated.

Fig. 6 is a vertical cross-section through the feed screw nut or slide and illustrates the device for absorbing the shock when the feed screw is reversed at the end of travel of the roller electrode in either direction.

Figure 1:
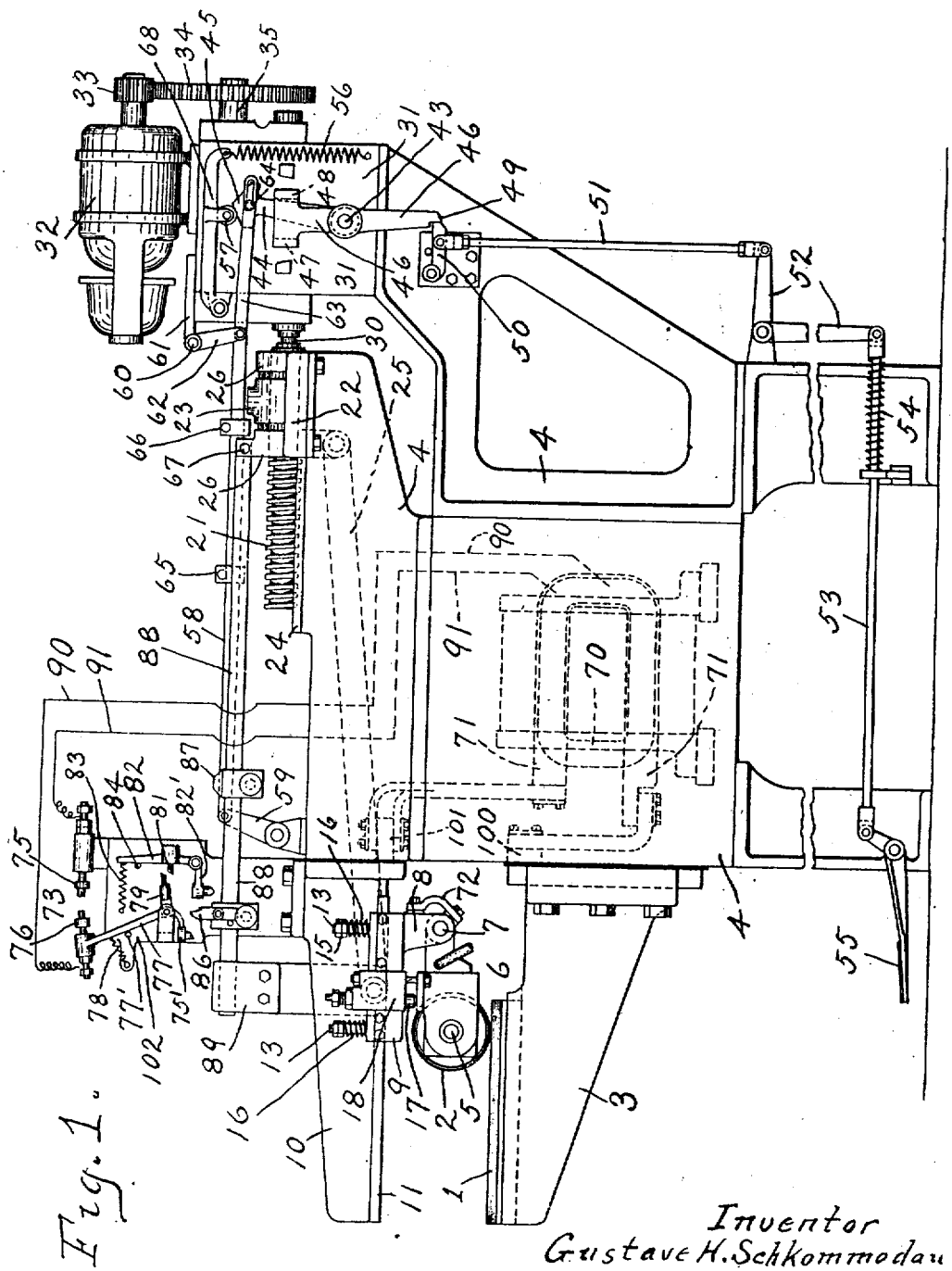

The welding mechanism embodies a plurality of electrodes 1, 2 which co-operate in applying electrical heat and mechanical pressure to the pieces of material composing the work, said electrodes being movable relatively one to the other, and at least one of said electrodes, for instance that indicated at 2, being a roller adapted to traverse the lapping or otherwise presented marginal portions of the material in order to produce a continuous seam or weld, whereby said marginal portions are united in a way to produce a seam or joint integral with the metal. Preferably said seam or weld is rolled by mechanical pressure acting upon the plastic metal to reduce the seam or weld substantially to the thickness of the individual pieces composing the work, thus eliminating rough or irregular surfaces at the seam between the pieces of metal.

The machine in accordance with this invention may be used to weld seams in flat or curved sheets of metal of any style, length or width. The seam may be formed along the lapped or abutted edges of the same piece or sheet of metal or different sheets and also may be formed in overlapped metal intermediate the edges. The sheets may be lapped any desired amount but when a weld is to be made along the edges, they preferably are lapped slightly less than the width of the treads or work contacting surfaces of the electrodes between which the work is gripped.

The work to be welded is suitably held by clamps or otherwise on a horn or mandrel 1 forming one of the electrodes of the machine. Clamps as well as other means for properly holding the work in adjusted position on the mandrel 1 are well known in the art and of various kinds according to the nature of the work and as such holding means forms no part of my present invention, illustration and description of such parts herein is dispensed with, it being understood that any suitable means for this purpose may be employed.

The mandrel or lower electrode 1 is preferably a flat elongated bar preferably supported in a stationary position in the machine, whereas the upper electrode 2 is a roller or disk mounted in a carriage for movement in a rectilinear path and into contact with the stationary electrode or mandrel 1, but it is to be understood that the invention is not limited to a stationary electrode and a movable roller electrode as other kinds and relations of electrodes may be employed without departing from the spirit of the invention. The mandrel or stationary electrode 1 comprises a single piece or bar of copper or other good conducting material, substantially rectangular in cross-section and has its top edges bevelled to produce a narrow tread surface. The bar 1 is as long as and preferably longer than the length of the seam to be welded, the tread surface being approximately equal in width to the width of the seam, depending on the amount of overlap. The bar 1 is seated and supported in an arm 3 secured to and projecting forwardly from the front of the main frame 4 of the machine.

The roller electrode 2 is composed of a mass of copper or other good electrical conducting material, the edge portions of which are beveled so as to produce a tread surface, the width of which is equal substantially to the width of the tread surface of stationary electrode 1, (see Fig. 2). Said roller electrode is carried by an arbor 5 which is mounted in any suitable way in bearings of a swinging arm 6, said arm being forked or slotted as shown in Fig. 2 to permit the roller electrode to rotate freely within the slotted portion. The carrying arm 6 is supported for pivotal movement on a spindle 7 mounted in depending lugs 8 of a carriage 9. Said carriage is fitted snugly to the under side of an overhanging rigid arm 10 forming one member of the frame 4 and projecting forwardly from said frame member so as to occupy a horizontal position over stationary electrode 1. The arm 10 is provided at its lower edge with lateral flanges 11 constituting a track or guideway for the carriage 9, the respective side portions of which are provided with upstanding flanges 12 which embrace the laterally extending flanges 11, as shown in Fig. 2, whereby the carriage is fitted slidably to the under side of the arm 10. Said carriage is provided with upstanding bolts 13 on which are loosely fitted wear plates 14 which are pressed forcibly into contact with the upper surfaces of the track flanges 11 by springs 16 which loosely encircle the bolts 13, and the tension of which springs is adapted to be regulated by adjusting the nuts 15 on said bolts. The wear plates 14 and spring 16 provide means for retaining the carriage 9 into close frictional contact with the under surface of the arm 10, thus compensating for wear due to the frictional engagement of the moving part 9 with the stationary part 10, but at the same time said carriage 9 is free to move in a rectilinear path along the guideway afforded by the overhanging arm 10 so as to impart a traversing movement to the roller electrode 2.

The required mechanical pressure from the roller electrode 2 to the material under treatment is secured by plungers 17, one of which is shown in detail in Fig. 4. Said plungers 17 are positioned at the respective sides of carriage 9 (see Fig. 2), and are fitted slidably in guides 18 provided on said carriage. The plungers are pressed downwardly by the action of springs 19 incased within the guides 18, and said plungers are in contact at their lower end portions with arms 20, which are rigid with the pivoted arm 6. The plungers 17 act to depress the arm 6 and thus press the roller electrode 2 into electrical and mechanical contact with the lapped portions of the metal to be welded and as a traversing movement is imparted to the roller electrode 2 current is supplied by the co-operating electrodes 1, 2 to said lapped portions of the metal for the purpose of rendering the same sufficiently plastic to respond to the pressure which is applied by the movement of the roller electrode over the stationary electrode or mandrel 1, as a result of which the plastic metal is rolled practically to the gage of the metal constituting the work.

For imparting the traversing movement to the carriage 9 and roller electrode 2, I employ a feed screw 21, a traveller 22 and a nut 23, substantially as shown in Figs. 1 and 3. Said traveller 22 is fitted for sliding movement in a horizontal path on guideway 24 forming a part of the machine frame 4; and in order to connect the traveller 22 with the carriage 9 a bar or link 25 is used, the same being housed or contained within a chambered part of the machine frame 4 as indicated in dotted lines in Fig. 1 and the respective end portions of said link or bar 25 are connected pivotally with traveller 22 and carriage 9. The traveller is provided with upstanding arms 26 between which is located the nut 23. Said nut is connected with traveller 22 for a limited sliding movement between the upstanding arms 26 in order to permit absorbing the shock on reversing the movement of the traveller 22 at the end of its stroke as will be hereafter described and furthermore the nut as a whole is in threaded engagement with the threads on the feed screw 21 whereby rotative movement of the feed screw imparts movement to the non-rotative nut 23 which in turn is communicated to the traveller 22 through the arms 26. The feed screw 21 is unitary with a drive shaft 30 journalled in suitable bearings provided on the frame 4 and upon a gear housing 31, the latter being fixedly attached to the rear part of the frame 4. Upon this gear housing is mounted a motor 32, the shaft of which is provided with a gear 33 that meshes with a gear 34 on a shaft 35, the latter extending within the gear housing 31. The shaft 35 drives a train of reversing gears 36, 37, 39, 40, 41. (See Fig. 5.) The gears 36, 37 are loose on the drive shaft 30 and the said loose gear 36 is in mesh with an idler 41, which in turn meshes with the gear 39 fast on the motor-driven shaft 35. The other loose gear 37 meshes directly with the gear 40 on the motor-driven shaft and thus the gears 36, 37 are normally driven in opposite directions to each other by the shaft 35, but said gears 36, 37 do not communicate motion to the shaft 30 or the feed screw 21 except when one of said gears 36, 37 is made fast with said shaft 30. The operation of making the gear 36 or the gear 37 fast with the shaft 30 is accomplished by a clutch 42 mounted on a shaft 43 in the gear housing 31, said clutch 42 being positioned between the gears 36, 37 and adapted to engage with clutch faces provided on said gears or to be retained in a neutral position intermediate said gears. The means for operating the clutch is controllable in a way by the traversing movement of the traveller 22, but means are provided also, for manually throwing the clutch into operative engagement with the gear 36 for the purpose of starting the machine into operation.

The clutch shaft 43 protrudes at one end beyond the gear housing, to which protruding end is mounted a fixed lever 46 and a loose lever 44, the upper part of the loose lever 44 being expanded to form a cam-shaped head 45, the cam surfaces of which are oppositely inclined to each other, as shown in Fig. 1. The upper part of this lever 46 is provided with lugs 47, 48 straddling the respective sides of the loose lever 44 and adapted to engage therewith. The lower end of the lever 46 is formed with a toe-piece 49 engaged by a latch 50 pivoted on the machine frame 4, and to this latch is connected a link 51, the lower end of which is pivoted to a bellcrank 52, the depending arm of said bellcrank being pivoted to a rod 53 which is pressed in one direction by a spring 54, said rod being pivoted to a foot-treadle 55 positioned within convenient reach of the operator stationed at the front of the machine. With the latch 50 in engagement with the lever 46, the clutch is locked in a neutral position free from engagement with the gears 36, 37, but when it is desired to set the machine into operation the attendant presses the treadle 55 and withdraws latch 50 from lever 46, which releases a spring 56, thereby pressing a roller 57 forcibly against one cam surface of lever 44. This rotates the shaft 43 and moves the clutch into engagement with the gear 37, as a result of which the feed screw is rotated in one direction so as to act on the nut 23 and impart traveling movement to the traveller 22, whereby the thrust bar 25 is actuated to impart movement to the carriage 9 and traversing movement is thereby imparted to the roller electrode with respect to the stationary electrode. The clutch is automatically disengaged from gear 37 as the roller electrode reaches the limit of its movement over the stationary electrode, and this action is brought about by an automatic stop mechanism now to be described.

58 designates a horizontal bar positioned in the upper part of the machine and intermediate the gear housing 31 and the rigid arm 10, one end of said horizontal bar being pivoted to a rocker 59 supported on the machine frame. The other end of this horizontal bar is linked to a rockshaft 60 supported in a bracket 61 attached to the gear housing 31, said rockshaft being provided with a depending link 62, to the lower end of which is pivoted a bar 63, the other end of which has a pin and slot connection 64 with the lever 44. Said horizontal bar 58 carries two stops 65, 66, which are adjustably fastened to said bar 58, and with these stops co-operates a pin 67 attached to one of the arms 26 of traveller 22, said pin 67 being positioned for movement between the stops 65, 66. As the traveller 22 moves forwardly under the action of the screw, the pin 67 approaches the stop 65, and when the traveller and the pin reach the limit of their forward movement, said pin strikes the stop 65 and imparts movement to the bar 58, the latter operating to rock the shaft 60 and swing the link 62 in a direction to impart movement to the bar 63, the operation of which imparts rocking movement to the lever 44 so as to swing it against lug 47 of lever 46. At this time roller 57 is on the opposite incline of the cam of lever 44 and the spring 56 (not being held by latch 50) then acts to swing levers 44 and 46 as a unit to rotate the shaft 43 and thus shift the clutch 42 from the gear 37 over to and into engagement with the gear 36, the result of which is to reverse the direction of rotation of the feedscrew 21. The screw now acts on the nut 23 to move the traveller 22 in a reverse direction, thus drawing the carriage 9 and the roller electrode 2 backwardly over the welded seam, such reverse movement taking place until the pin 67 strikes the other stop 66, whereupon the bar 58 and rockshaft 60 are operated to impart movement in a reverse direction to the bar 63, and thus return the levers 44 and 46 to initial position wherein the clutch 42 is free from engagement with gears 36 or 37. This stops the operation of the machine, the lever 46 being again held in position engaged by the latch 50 which acts to lock the clutch in a neutral position, the spring 56 being prevented from acting by the latch 50.

The spring 56 heretofore described is anchored at one end to the gear housing, its other end being attached to a lever 68, said lever being pivoted on the gear housing and being provided intermediate its ends with a lug on which is mounted the roller 57, as shown in Fig. 1, said lever 68 and the spring 56 being yieldable to the cam surfaces of the lever 44 when said lever is operated due to the action of the automatic stops 65 and 66.

To overcome the inertia of the moving parts and to absorb the shock due to the sudden reversal of travel of the nut 23 when the direction of rotation of the feed screw is reversed at the time the roller electrode reaches the end of its travel in either direction, and thereby prevent loosening of or damage to the various parts of the machine, I preferably arrange said nut so that it will act as a shock absorbing device as will now be described. The feed nut 23 is held from rotative movement with respect to the traveller 22 by a bar 95 secured to the underside of the traveller and passing loosely through a correspondingly formed groove in the nut, as shown in Fig. 6. The nut is provided with an elongated sleeve 23′ which has threaded engagement with feed screw 21. For convenience in assembly, the sleeve 23′ is made as a separate part. The sleeve 23′ is however rigidly secured to the part 23, so that to all intents and purposes the two parts form a unitary whole. The sleeve 23′ is adapted to slide in bearings formed in the traveller 22 to a limited extent independent of any movement of the traveller, the part 23 of the nut having a lost motion between the arms 26 of the traveller to permit this independent motion.

96 indicates spindles passing loosely through the nut 23 and bearing at opposite ends against the arms 26. Coil springs 97 disposed on the spindles 96 within the body of the nut 23 bear at opposite ends against a freely slidable washer 98 and a freely slidable sleeve 99.

When the roller electrode 2 and its carriage 9 and consequently the traveller 22 reach the end of the stroke in one direction, the rotation of the feed screw 21 is suddenly reversed as previously described. Instead of a sudden blow to the traveller and its attendant parts as would be the case were the connection between the nut and the traveller a rigid one, any shock due to the reversing of the feed screw is absorbed by the springs 97 as it is only through these springs that the shift in movement can be transmitted to the traveller 22. The lost motion between the nut 23 and the traveller 22 permits these springs to act in an obvious manner.

The machine disclosed herein embodies a transformer positioned within a chambered part of the main frame 4 whereby the weight of said transformer is not imposed on the movable part of the machine, such as the element which carries the movable electrode. 70 indicates the primary of the transformer and 71 the secondary which may be of any desired type or arrangement. One terminal of the secondary is electrically connected at 100 to the lower horn or arm 3 and the other terminal is electrically connected at 101 to the overhanging arm 10, current being conducted to the roller electrode through the carriage 9 and pivoted arm 6, a shunt connection 72 being preferably provided to prevent arcing as well as to provide a good connection around the pivot of the arm 6.

In this as in other types of apparatus in this class the flow of current in the secondary circuit is controlled by the making and breaking of the primary circuit.

The flow of current across the electrodes is dependent upon the contact of roller electrode 2 with the lapped portions of the metal, and upon the operation of a cut-out or circuit controller 73 supported on a bracket 102 and connected in the primary circuit of the transformer as shown in Fig. 1. This cut-out comprises a stationary contact 75 and a movable contact 76, the latter being on a vibratory arm 77 under the control of a spring 78. Integral with the vibratory arm is a trigger arm 75′ and a detent 79. 81 indicates a movable detent carried by vibratory arm 82 under the control of a spring 83, and adapted to be held in a normal position against the stop 84. The vibratory arm 82 is in the form of a bellcrank, having a trigger arm 82′. The trigger arms 75′ and 82′ co-operate with stops, or fingers 86, 87 respectively, carried on a shiftable bar 88. One end of the shiftable bar 88 is supported in an upstanding arm 89 of the carrier 9, said arm extending upwardly through a slot in the overhanging rigid arm 10, but the other end of the horizontal bar 88 is pivoted to the forward arm 26 of traveller 22. In the normal position of the cutout the spring 78 holds the vibratory arm 77, against stop 77′, whereby the contact 76 is free from the contact 75, and from these contacts 75, 76 run conductors 90, 91 leading to the primary coil 70 of the transformer through any of the intermediary devices desired to be employed and ordinarily used in this connection in this art so as to prevent the flow of current to the electrodes 1, 2 in the normal position of the mechanism. As the electrode 2 makes contact with the lapped marginal portions of the metal, the finger 86 is carried by the forward movement of the traveller and by engaging the trigger arm 75′, swings the vibratory arm 77 and moves the contact 76 into electrical engagement with contact 75, and thus establishes the flow of current to electrodes 1 and 2, the effect of which is to render plastic the metal under treatment, and as the electrode 2 traverses the metal and the electrode 1, the metal is pressed together and welded to produce a continuous seam. At this time the contacts 75 and 76 are held together by the detent 79, being located beneath the detent 81. By the time that the electrode 2 completes its forward movement, the stop 87 strikes the trigger arm 82', and actuates the arm 82 thus freeing the detent 79 from the detent 81, allowing the spring 78 to rock the arm 77 and break the circuit. The switch members being held apart during the return stroke of the machine by the spring 78. During the reverse, or return movement of the traveller 22, and bar 88, the finger 86 must pass under the trigger arm 75'. To permit this, the finger 86 is pivotally mounted in such way that it slips under the trigger 75' on the return movement, but on the forward movement, it strikes the trigger rigidly.

The operation of the machine is as follows: The work is placed on the lower mandrel or stationary electrode 1 in proper position. The operator presses on the treadle 55 and the motor is thereby actuated to impart the traversing movement to roller electrode 2, current being supplied to said electrode 2 and the electrode 1 to render the metal plastic. The roller electrode travels between the work holders and over electrode 1 to effect the welding progressively, for the reason that the metal is rendered plastic as the roller passes along said metal, and said roller cooperates with electrode 1 in applying the pressure required to effect the union of the marginal portions of the metal, as a result of which a continuous seam is produced which affords a satisfactory union between the marginal portions, the application of pressure rolling the metal along the seam down to the gage of the individual pieces composing the sheets, in case two sheets are welded in the manner described. As the roller electrode reaches the limit of its movement, the cut-out operates to preclude the flow of current, and the driving mechanism then becomes effective in imparting reverse motion to the carriage and to the roller electrode so as to return said parts to their initial positions.

Obviously the various current carrying parts of the machine may be and preferably are supplied with water circulating means to keep the various parts cool as is the customary practice in the art.

It will be understood that the invention is not limited to the details of construction and arrangement of parts as shown and described except as may be specified in the appended claims.

What I claim as my invention is:

1. In an electric seam welding machine, the combination with a roller electrode and a co-operating electrode, one of said electrodes being bodily movable with relation to the other, of a feed screw for the movable electrode, reversible driving means for said feed screw and a shock absorbing device automatically acting upon reversing the rotation of said feed screw.

2. In an electric seam welding machine, the combination of a roller electrode adapted to travel bodily with respect to the work, a feed screw, means operatively connecting said feed screw and said electrode, reversible driving means for said screw and a shock absorbing device automatically acting upon reversing the rotatation of said feed screw.

3. In an electric seam welding machine, the combination of a roller electrode, a relatively stationary electrode, a carriage on which the roller electrode is mounted, a feed screw, a nut connected with said carriage and threaded on the feed screw, reversible driving means for said feed screw and a shock absorbing device interposed in the connection between said nut and said electrode and acting upon the reversal of rotation of said feed screw.

4. In an electric seam welding machine, the combination of a roller electrode, a relatively stationary electrode co-operating with said roller electrode, a carriage on which the roller electrode is mounted, a feed screw, a traveller connected to said carriage, a feed nut associated with said traveller and threaded on said feed screw, reversible driving means for said feed screw and a shock absorbing device interposed between said nut and said traveller.

5. In an electric seam welding machine, the combination of a roller electrode, a relatively stationary electrode co-operating with said roller electrode, a carriage on which the roller electrode is mounted, a feed screw, a traveller connected to said carriage, a feed nut connected with said traveller and threaded on said feed screw, reversible driving means for said feed screw and springs interposed between said nut and said traveller and adapted to act as a shock absorber on reversing the rotation of said feed screw.

Signed at Lynn in the county of Essex and State of Massachusetts this 26th day of November A. D. 1918.

GUSTAVE H. SCHKOMMODAU.

Witnesses:
C. F. TISCHNER,
GEORGE E. BARSTOW.